United States Patent [19]
Rhoden

[11] 3,967,721
[45] July 6, 1976

[54] BELT DRIVE CONVEYOR SYSTEM
[75] Inventor: Ivan E. Rhoden, Plainfield, Ind.
[73] Assignee: FMC Corporation, San Jose, Calif.
[22] Filed: July 8, 1974
[21] Appl. No.: 486,552

[52] U.S. Cl. .................................................. 198/195
[51] Int. Cl.² ..................... B65G 17/12; B65G 17/42
[58] Field of Search .................. 198/151, 175–176, 198/189, 195, 208; 74/233, 234, 236; 56/290, 291

[56] References Cited
UNITED STATES PATENTS

| | | | |
|---|---|---|---|
| 242,905 | 6/1881 | Ewart | 74/234 |
| 366,472 | 7/1887 | Garland | 74/235 |
| 527,722 | 10/1894 | Sargent | 198/175 |
| 527,723 | 10/1894 | Sargent | 198/175 |
| 729,296 | 5/1903 | Edgerton | 198/195 |
| 1,422,151 | 7/1922 | Walker | 198/151 |
| 1,655,920 | 1/1928 | Roderwald | 74/233 |
| 2,566,262 | 8/1951 | Traxler | 74/237 |
| 2,808,924 | 10/1957 | Wood | 198/208 |
| 3,643,792 | 2/1972 | Resener | 198/189 |
| 3,651,626 | 3/1972 | Locati | 56/290 |
| 3,682,012 | 8/1972 | Blankenship | 56/291 UX |
| 3,718,197 | 2/1973 | Barten et al. | 198/208 |
| 3,754,636 | 8/1973 | Boy | 198/195 |
| 3,808,901 | 5/1974 | Berg | 74/236 |
| 3,831,358 | 8/1974 | Marsh et al. | 198/175 |
| 3,876,089 | 4/1975 | Moser | 198/195 |

Primary Examiner—Evon C. Blunk
Assistant Examiner—Jeffrey V. Nase
Attorney, Agent, or Firm—C. E. Tripp

[57] ABSTRACT

A belt drive conveyor system is disclosed which includes a flexible rope or a plurality of ropes having longitudinally spaced wedge shaped driving blocks mounted thereon for driving engagement with V-groove sheaves or toothed wheels. The driving blocks have a load support member imbedded in and molded as an integral part of the block. The load support member permits conveyor slats or other forms of conveying surfaces to be secured to the belt to provide wider conveying surfaces.

8 Claims, 10 Drawing Figures

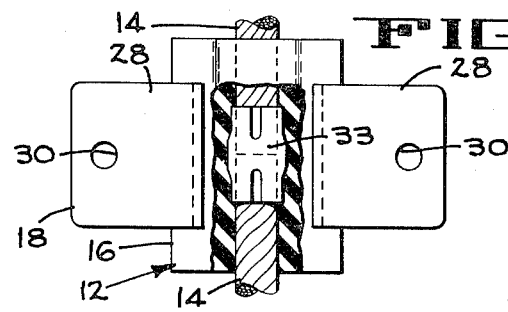
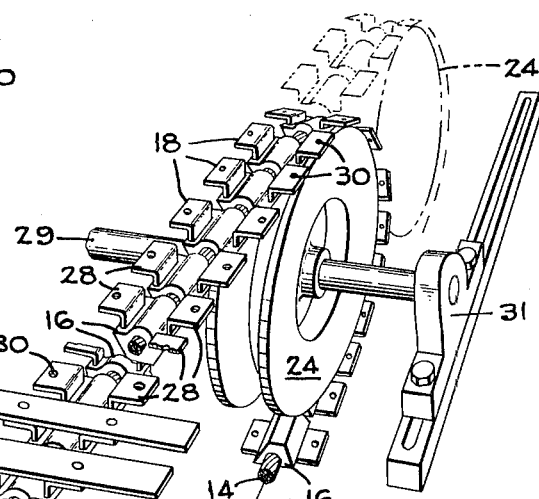
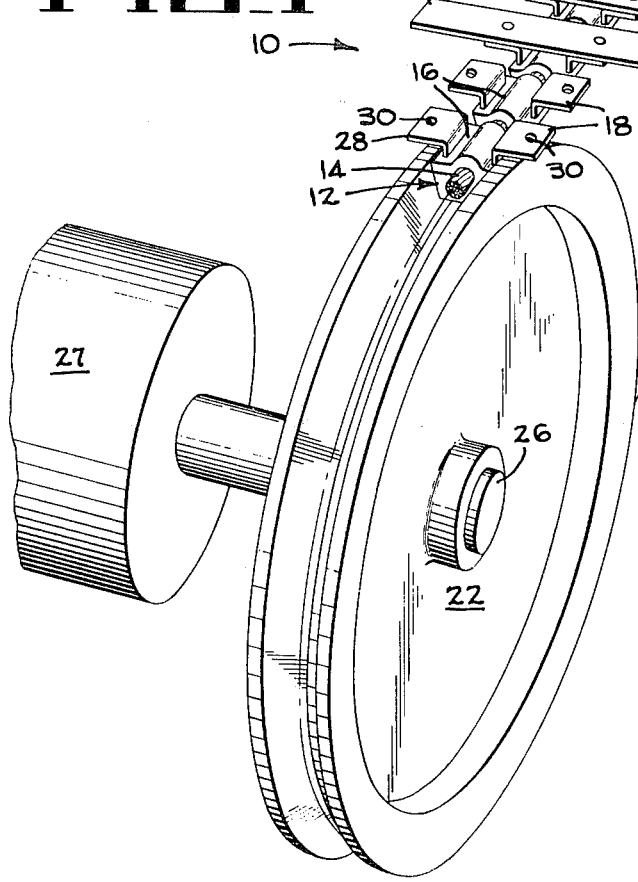
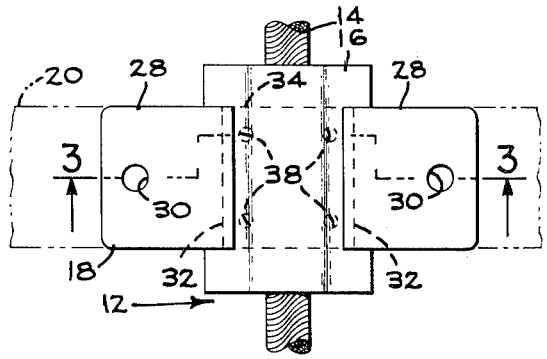
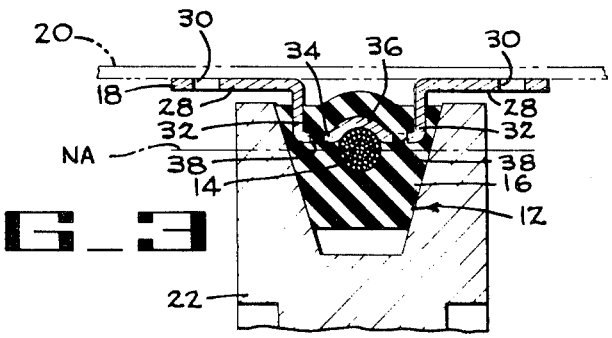

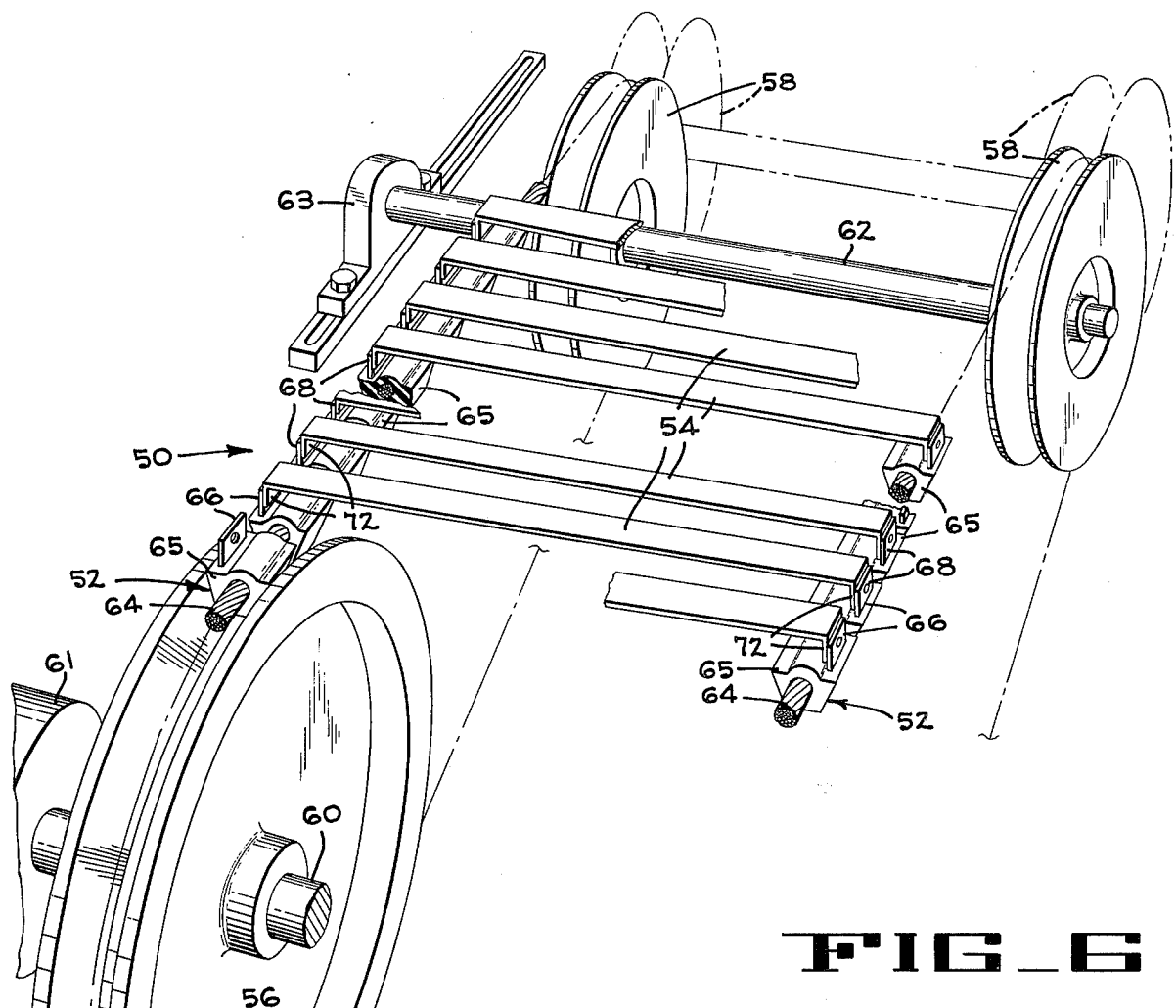
FIG_4
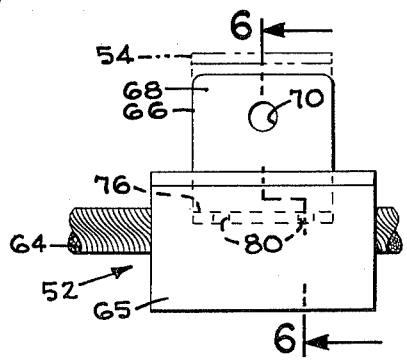
FIG_5
FIG_6

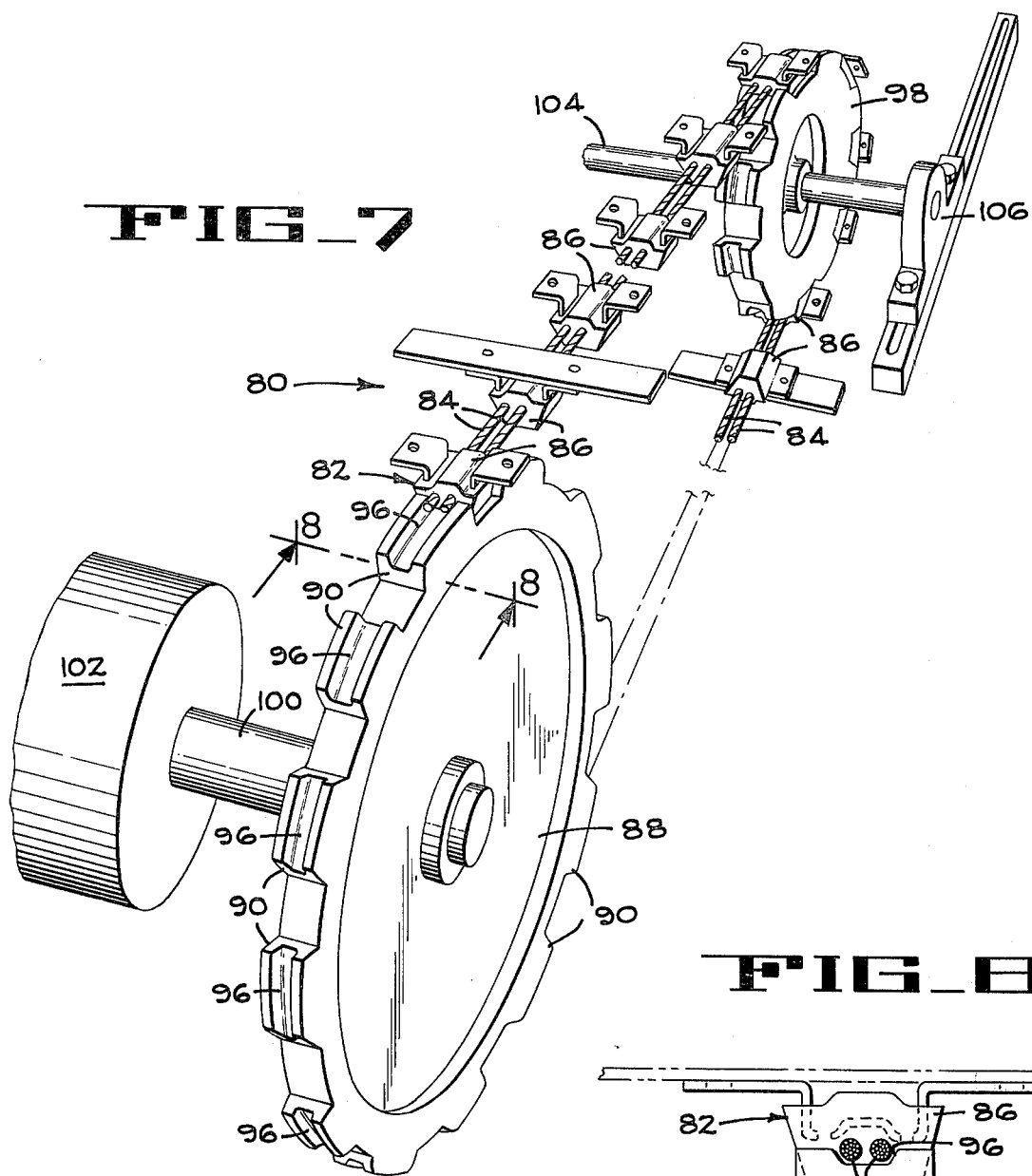
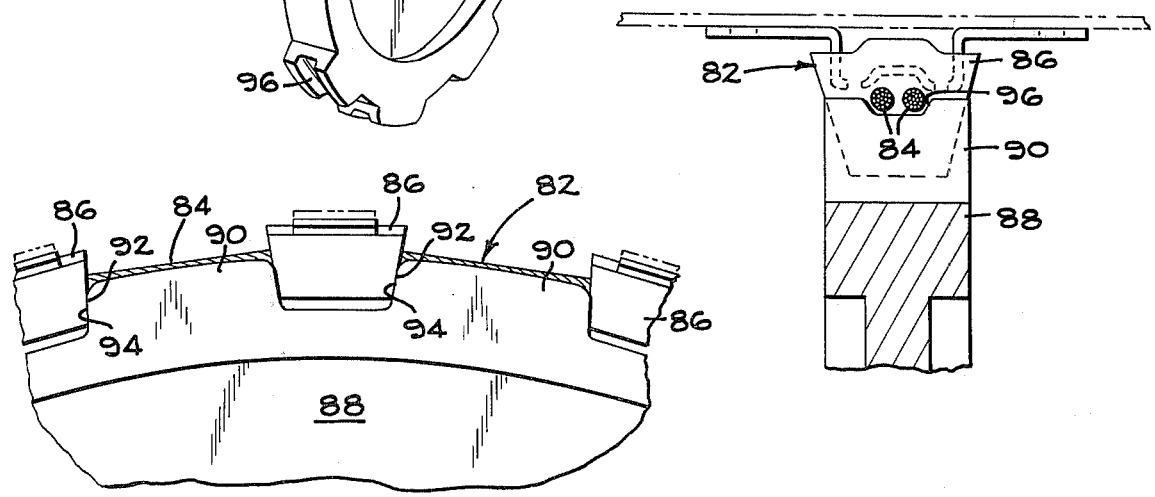

BELT DRIVE CONVEYOR SYSTEM

BACKGROUND OF THE INVENTION

This invention relates to conveyors for handling articles, packages and bulk material and more particularly to a novel endless drive belt to which slats, aprons, or pans may be connected to form a conveying surface.

Endless rubber V-belts are commonly used for transmitting power between two shafts having pulleys or sheaves with V-grooves. These V-belts are relatively narrow in width so as to be flexible and are generally restricted to rather short distances between shafts since they are generally molded endless. Due to their restricted width and centers conventional V-belts are thus not suitable for use as conveyors carrying an article for any significant distance. U.S. Pat. No. 2,023,421 dated Dec. 10, 1935, and issued to D. HEYER is typical of the above V-belts. U.S. Pat. No. 2,430,500 dated Nov. 11, 1947, and issued to A. L. FREEDLANDER et al. is typical of a wire reinforced double cog V-belt. U.S. Pat. No. 2,881,904 to R. HOERTH dated Apr. 14, 1959, shows a rubber drive belt having a chain as a tensile member.

The use of axially spaced friction blocks of V-cross-section mounted on wire rope or cable to form an endless drive belt for transmitting power is also old. U.S. Pat. No. 242,905 to W. D. EWART dated June 14, 1881, shows metal blocks clamped to ropes at spaced intervals and U.S. Pat. No. 1,655,920 to R. RODERWALD dated Jan. 10, 1928, shows a fabric reinforced belt to which trapezoidal shaped rubber blocks are vulcanized at spaced intervals.

U.S. Pat. No. 2,566,262 to E. R. TRAXLER dated Aug. 28, 1951, discloses the use of crimped connectors for joining the ends of individual wire cables in splicing wide conveyor belts having steel cable reinforcement.

The attachment of a conveying or elevating element to an endless belt or chain has taken away many forms and typical of some of these in the patented art are: U.S. Pat. No. 331,703 to P. GRATER et al. dated Dec. 1, 1885; U.S. Pat. No. 711,993 to V. W. MASON Jr. dated Oct. 28, 1902; U.S. Pat. No. 729,296 to C. EDGERTON dated May 26, 1903; U.S. Pat. No. 967,424 to P. L. O'TOOLE dated Aug. 16, 1910; U.S. Pat. No. 1,422,151 to H. B. WALKER dated July 11, 1922; and U.S. Pat. No. 3,231,070 to H. MULLER dated Jan. 25, 1966.

SUMMARY OF THE INVENTION

While a variety of belt drive systems are available for the primary purpose of transmitting power and/or motion, the present invention discloses a simple novel arrangement of an endless flexible conveyor belt comprising a rope or ropes to which trapezoidal resilient driving blocks are attached at spaced longitudinal intervals. The blocks provide the driving contact with V-groove sheaves or toothed wheels and have integrally molded load support members in the form of channels or angles for the purpose of carrying articles or packages. The load support members may be used directly as a conveying surface or may be used to connect transverse slats, pans, or aprons between two spaced belts to provide a wider conveying surface and/or to carry bulk material. The conveyor belt may be made in any length and the ends of the rope or ropes joined by a simple mechanical connection usually located within the spaced driving blocks.

It is an object of the present invention to provide a simple belt for a conveyor system utilizing at least one flexible rope and spaced resilient wedge blocks.

It is a further object to provide an improved belt including a flexible rope tensile member and a series of spaced frictional resilient driving blocks which have an integral load support member forming a conveying surface.

It is another object to provide an improved positive drive belt including a flexible tensile member and a series of spaced resilient driving blocks which drivingly engage toothed wheels.

It is another object to provide an improved belt having spaced resilient driving blocks with integrally molded members which may be used to connect two spaced belts with transverse material carrying slats or pans.

It is another object to provide an improved rubber-like driving block having an integral load support member wherein the rubber-like material passes through openings in the member as well as completely surrounds the imbedded portion of the member so as to completely secure the member to the driving block.

It is another object to provide a simple inexpensive belt drive conveyor system which is relatively noiseless in operation, does not require lubrication, is capable of higher speed operation than chain conveyors and requires minimum physical space.

Further objects and advantages of the invention become apparent by reference to the following specification taken in conjunction with the accompanying drawings.

BRIEF DESCRIPTION OF THE DRAWINGS

FIG. 1 is a perspective view of the belt drive conveyor system of the present invention.

FIG. 1A is a cut-away section of the driving block showing the splicing means for joining the ends of the rope.

FIG. 2 is a plan view of one driving block with its load support member and a portion of the rope tensile member.

FIG. 3 is a sectional view taken along lines 3—3 of FIG. 2.

FIG. 4 is a perspective view of a conveyor system of the present invention showing two spaced parallel belt drives.

FIG. 5 is a side elevational view of the conveyor system of FIG. 4 showing one driving block with its load support member and a portion of the endless rope.

FIG. 6 is a sectional view taken along lines 6—6 of FIG. 5.

FIG. 7 is a perspective view of the third embodiment of the present invention showing positive driving of the belts.

FIG. 8 is a sectional view taken along lines 8—8 of FIG. 7.

FIG. 9 is a partial view of the positive engagement of the belt with the wheels shown in FIG. 7.

DESCRIPTION OF THE PREFERRED EMBODIMENTS

FIGS. 1-3 illustrate the simple construction of the belt drive conveyor system 10 of the present invention using a single belt. The belt 12 comprises a single flexible rope 14 or a plurality of ropes as shown in FIG. 8 forming the tensile element of the belt and a plurality of elongated wedge shaped driving blocks 16 at spaced intervals mounted on the rope and forming the driving element of the belt. The driving blocks 16 include load support members or brackets 18 to which article carrying members 20, such as conveyor slats or pans, are secured to provide a suitable conveying surface for the article or material to be carried. The belt 12 passes around a V-groove driving sheave 22 and a V-groove driven sheave 24. These sheaves are separated as necessary for the length of the conveyor desired. The driving sheave 22 is mounted on a drive shaft 26 which forms the output shaft of a motorized gear reducer drive 27 used to rotate the driving sheave. The inclined sides of the trapezoidal driving blocks frictionally engage the mating sides of the V-groove in the driving sheave 22 to provide the driving traction for moving the belt 12. The driven sheave or takeup sheave 24 is mounted on a shaft 29 which is adjustably positioned on takeup bearings 31 to provide takeup of slack in the belt 12.

In the case of long center distances between the driving and driven sheaves, the carrying run of the belt 12 is supported on intermediate idler wheels (not shown) which are located at intervals at a suitable spacing to properly support the load being conveyed. These idler wheels are in the form of either rotatable cylindrical rollers supporting the bottom surface of the friction blocks 16 or rotatably V-groove sheaves similar to, but usually smaller than, the driving and driven sheaves 22 and 24 to provide a low friction roller type intermediate support. Alternately, a straight continuous flat track or V-groove guide of low friction material, such as a plastic, may be used as an intermediate support and/or guide for the carrying run of the belt 12.

A series of different sizes of belts 12 having various combinations of diameters and quantity of ropes 14 and cross-sections of frictional blocks 16 is provided to suit a wide range of conveyor applications. The particular rope 14 is selected from commonly available conventional flexible rope constructions, such as for hoisting service. The cross-section of the driving blocks 16 is selected to be compatible with the diameter and strength or working load of the particular rope and the quantity of ropes used. The rope is generally made of steel, but is not limited to steel as natural or synthetic fibers may be used.

The belt 12 with its assembled driving blocks 16 is made in convenient lengths for handling and stocking. The belt is made endless to suit the particular conveyor installation by splices to join the ends of the rope 14. The splice or connector is a simple mechanical one which, in one form as shown in FIG. 1A utilizes a short tubular sleeve 33 into which the ends of the rope are placed and then the sleeve is crimped with the aid of a manual or power assisted crimping tool to securely lock the rope to the sleeve. Since the sleeve is only slightly larger than the rope and smaller than the width of the driving blocks, this axially in-line splice easily passes within the V-groove of the sheaves without contact or interference. The splice is generally located within a driving block or in some instances in place of a driving block, so as to maintain flexibility for articulation of the rope as it passes around the sheaves.

Each driving block 16 is molded of an elastomeric material such as rubber or one of the readily available synthetic rubber-like materials. The block has a substantially trapezoidal cross-section generally conforming to the cross-section of one of the conventional standardized power transmission V-belts so as to use readily available conventional V-belt sheaves for the driving and driven wheels as well as for the idler wheels if used. The length of each block 16 is variable depending upon its use but would generally fall within the range of 1.0 to 2.5 times the top width of the cross-section of the block so as to operate satisfactorily on relatively small diameter sheaves. The axial spacing of these driving blocks along the rope 12 is also variable depending upon their use, but this spacing would generally fall within the range of 0.50 to 3.0 times the length of the block so as to permit flexing of the rope between the blocks as the belt passes around the sheaves.

The driving block 16 is molded to and around the rope or ropes 14. The rope is positioned with respect to the cross-section of the block on the transverse centerline and vertically at about the neutral axis (NA) of the trapezoidal cross-section as shown in FIG. 3 or uniformly spaced about the transverse centerline if multiple ropes are used as shown in FIG. 8. The load support member 18 is a formed metal bar having two horizontally projecting ears 28, each normally having at least one hole 30. As shown these ears extend above the top of the friction block so as to clear the top of the sheaves and project transversely beyond the sides of the block so that the article carrying member 20, such as a conveyor slat or pan, may be riveted or bolted to the top of the load support member without causing interference with the sides of the sheaves. The slat 20 as shown, is a rectangular bar of metal or plastic extending transversely of the belt beyond the ends of the ears 28 as desired to provide a suitable conveying surface. The article carrying member 20 may take other forms than that shown to better handle particular articles or bulk material and is secured to the member 18 in a similar manner. The load support member 18 as shown in FIG. 3 further has two vertical leg sections 32 and a horizontal central section 34 connecting the vertical legs. The mid-portion 36 of the central section 34 is curved to fit closely in generally conforming relation around the upper half of the rope or ropes 14 so that the central section 34 is closely adjacent to the neutral axis of the block 16.

A particular feature of this load support member 18 is that a plurality of holes or openings 38 are provided in the central section 34 between the vertical leg sections 32 and the curved mid-portion 36. These holes or openings 38 are provided to permit the rubber-like material of the block to flow through these holes during the molding operation of the block. Since the thickness of the rubber above the member 18 is necessarily limited and the side clearances between the vertical leg sections 32 and the inclined outer sides of the block 16 are also limited, the integrally molded material passing through these holes 38 serves the function of anchoring the member 18 solidly in the block 16, similar to a mechanical riveting or fastening method, and thus provide a physical tie between the layer of rubber above the member and the main body of rubber in the block below the member 18. The spacing of these holes and the ties of rubber in these holes together with integrally molded rubber all around the imbedded portions of the load support member thus provide strong resistance to the eccentric loads on the member which might otherwise tend to separate the relatively thin layer of rubber above the member from the main body of the driving block.

Thus, belt 12 as shown in FIGS. 1–3 and described above, with its driving blocks 16 having the load support member 18 imbedded in and molded as an integral part of the block and having the conveyor slat 20 fastened to the load support member when required, provides an extremely simple, inexpensive conveying medium for light duty applications. This belt has the further advantages of being relatively noiseless, of not requiring lubrication, of being capable of operating at higher speeds than comparable chain conveyors, and of occupying minimum physical space.

FIGS. 4–6 illustrates a second embodiment 50 of the present drive belt conveyor system wherein both or more parallely spaced belts 52 are connected by transverse article carrying members such as conveyor slats, pans or aprons 54 to provide a wider conveying surface than is practical with the single drive belt conveyor system shown in FIGS. 1–3 and previously described.

In this second embodiment the drive belt conveyor system 50 is generally similar to the previously described single belt system 10. However, two or more belts 52 are parallely mounted to pass around two or more spaced V-groove sheaves or pulleys 56 and two or more spaced V-groove driven sheaves 58. The driving sheaves 56 are mounted on a common rotatable drive shaft 60 and a suitable drive, such as a motorized gear reducer 61, is connected to drive shaft 60 to rotate the driving sheaves. The driven or takeup sheaves 58 are mounted on a common shaft 62 which is adjustably positioned on takeup bearings 63 to provide takeup of the slack in the belts. Idler wheels or straight flat tracks or guides (not shown) may be used, as previously described, as intermediate supports for each of the carrying runs of belts 52.

The belts 52 are also similar to belt 12 previously described so only the parts which are different will be described in detail. Each belt 52 comprises a flexible rope or ropes 64 forming the tensile element of the belt and a plurality of elongated trapezoidal shaped driving blocks 65 mounted on the rope at longitudinally spaced intervals and forming the driving element of the belt. Each driving block 65 has a load support member 66 molded integrally in the block as previously described for blocks 16 and load support members 18. However, the shape of load support member 66 is formed slightly differently from member 18. Load support member 66 is L-shaped having a vertically upstanding leg section 68 with at least one hole 70 for fastening the conveyor slats 54. The conveyor slat 54, as shown in FIG. 4, is a rectangular metal or plastic bar having downwardly flanged ends 72 with holes 74 for use in riveting or fastening the slat 54 to the upstanding leg 68 of the member 66. The conveyor slats 54 may also take the other forms than that shown to better handle particular articles or materials. As shown in FIG. 6 the load support member 66 further has a horizontal leg section 76 with a curved mid-portion 78 which is formed to fit closely around and similarly generally conform to the upper half of the rope 64 so that the horizontal leg section 76 is closely adjacent to the neutral axis NA of the driving block 65.

As previously described for member 18, the load support member 66 also has a plurality of holes or openings 80 in the horizontal leg section 76 positioned between the curved mid-portion 78 and the vertical leg section 68 on one side and the outer end 82 of the horizontal leg section on the other side of the curved mid-portion 78. Like the previously described member 18, holes 80 in member 66 permit the rubber-like material to flow through these holes or openings during the molding operation of the block 64 to solidly anchor member 66 to friction block 65.

It is to be noted that when more than two parallel belts are used on a single conveyor system, a slight modification is made to the load support members 66' on the inside belts while the outside belts have the described L-shaped, load support members 66. The load support members 66' (see FIG. 6) on the inside belts are then provided with two upstanding vertical leg sections 68' to form a symmetrical U-section so that the end flanges 72 on the conveyor slats 54 on either side of the inner belts can be fastened to the load support member in a manner similar to their attachment on the outside belts. The central horizontal leg section connecting the two upstanding vertical leg sections 68' remains as previously described for the L-shaped load support member 66, except that the horizontal leg section connects to both vertical leg sections 68' instead of to the single vertical leg section.

Thus, multiple belts 52, as shown in FIGS. 4–6 and described above, with their friction blocks 65 having the load support member 66 imbedded in and molded as an integral part of the block and having the conveyor slat 54 fastened to the load support member, provide an extremely simple, inexpensive conveying medium for light duty applications where a wider conveying surface is required, than is practical with a single belt, while maintaining all of the advantages mentioned previously for the single belt system.

FIGS. 7–9 illustrate a third embodiment of the present drive belt conveyor system 80 wherein the belts positively engage toothed driving wheels in lieu of relying on frictional contact with V-groove sheaves for traction. The belt 82 comprises a tensile member formed of one or more ropes 84 and a series of spaced trapezoidal shaped driving blocks 86. The belt 82 is of the same construction as previously described for belts 12 and 52. However in lieu of a V-groove driving sheave, a toothed driving wheel 88 is provided. Teeth 90 are uniformly spaced around the periphery of the wheel 88 to receive the driving blocks 86 between adjacent teeth as best indicated in FIG. 9. Driving is then accomplished by the contact of the end face 92 of the driving block with the transverse face 94 of the teeth 90 of the toothed wheel 88. The top of each tooth 90 is provided with a groove 96 for clearance with the continuous rope or ropes 84 as best shown in FIG. 8 since the height of the teeth 90 project at least up to the center of the rope or ropes 84.

In the belt drive conveyor system 80 the belt 82 passes around the toothed driving wheel 88 and a driven wheel 98. These wheels are separated as necessary for the length of the conveyor desired. The driving wheel 88 is mounted on a drive shaft 100 which forms the output shaft of a motorized gear reduced drive 102 used to rotate the driving wheel. The driven or takeup wheel 98 is generally a V-groove sheave, but can also be a toothed wheel or a flat faced pulley. The driven wheel 98 is mounted on a shaft 104 which is adjustably positioned on takeup bearings 106 to provide takeup of slack in the belt 82.

It is to be noted that the single belt drive conveyor system 80 can also be utilized in a multiple belt conveyor system in the same manner as previously described in the second embodiment and shown in FIGS. 4–6. The multiple belts 82 will then operate on a plurality of toothed driving wheels, similar to driving wheel 88 described above, for positive driving of the belts to insure lateral alignment of the conveyor slats is maintained perpendicular to the direction of travel of the belts.

The novel belt drive conveyor system as described herein can thus operate on either conventional V-groove sheaves by frictional contact or on toothed wheels as a positive drive maintaining all of the advantages previously mentioned.

Although the best mode contemplated for carrying out the present invention has been herein shown and described, it will be apparent that modification and variation may be made without departing from what is regarded to be the subject matter of the invention.

What is claimed is:

1. A low noise level conveyor system comprising a pair of spaced wheels, a flexible longitudinal tensile element, a plurality of resilient driving blocks mounted on said tensile element in spaced apart relation, said driving blocks formed for receipt on said wheels, splicing means to join the ends of said tensile element to form an endless band to be received over said wheels, and a separate load support member secured to each of said resilient driving blocks on said endless band, each said member including a curved portion embedded within said block adjacent said tensile element and in overlying and generally conforming relation to said tensile element when said members are in load-supporting relation.

2. The conveyor system of claim 1 wherein said spaced wheels comprise pulleys having V-grooves and wherein the driving blocks are substantially trapezoidal in cross-section for receipt in said V-grooves for driving engagement with the wheels.

3. The conveyor system of claim 1 wherein said spaced wheels are toothed and wherein the driving blocks are received between the teeth for driving engagement with the wheels.

4. The conveyor system of claim 1 wherein said load support member is a bracket molded in said driving block and wherein said bracket supports an article carrying member.

5. A low noise level conveyor system comprising two pair of spaced wheels, a flexible longitudinal tensile element for each pair of wheels, a plurality of resilient driving blocks mounted on each of said tensile elements in spaced apart relation, said driving blocks formed for receipt on said wheels, splicing means to join the ends of said tensile elements to form endless bands to be received, respectively, on said pairs of wheels, and article-carrying slats each supported at their opposite ends by a single resilient block on the respective tensile elements, each said slat including a curved portion embedded within said block adjacent said tensile element and in overlying and generally conforming relation to said tensile element when said members are in load-supporting relation.

6. A low noise level conveyor system comprising a pair of spaced wheels, a flexible longitudinal tensile element, a plurality of resilient driving blocks mounted on said tensile element in spaced apart relation, said driving blocks formed for receipt on said wheels and each having a single load support bracket molded therein, splicing means to join the ends of said tensile element to form an endless band to be received over said wheels, and a separate article-carrying slat secured to each of said load support brackets, each said bracket including a curved portion embedded within said block adjacent said tensile element and in overlying and generally conforming relation to said tensile element when said members are in load-supporting relation.

7. The conveyor system of claim 6 wherein said spaced wheels comprise pulleys having V-grooves and wherein the driving blocks are substantially trapezoidal in cross-section for receipt in said V-grooves for driving engagement with the wheels.

8. A low noise level conveyor system comprising two pair of spaced wheels, a flexible longitudinal tensile element for each pair of wheels, a plurality of resilient driving blocks mounted on each of said tensile elements in spaced apart relation, said driving blocks formed for receipt on said wheels and each having a single separate load support bracket molded therein, splicing means to join the ends of said tensile elements to form endless bands to be received, respectively, on said pair of wheels, and article-carrying slats each secured at opposite ends to one of the load support brackets on said respective bands, each said bracket including a curved portion embedded within said block adjacent said tensile element and in overlying and generally conforming relation to said tensile element when said members are in load-supporting relation.

* * * * *

UNITED STATES PATENT OFFICE
CERTIFICATE OF CORRECTION

PATENT NO. : 3,967,721
DATED : July 6, 1976
INVENTOR(S) : IVAN E. RHODEN

It is certified that error appears in the above-identified patent and that said Letters Patent are hereby corrected as shown below:

Column 1, line 39; after "taken" delete "away".
Column 5, line 13; change "both" to --two--.
Column 5, line 23; after "V-groove" add --driving--.

Signed and Sealed this twenty-third Day of August 1977

[SEAL]

Attest:

RUTH C. MASON
Attesting Officer

C. MARSHALL DANN
Commissioner of Patents and Trademarks